Patented Oct. 29, 1946

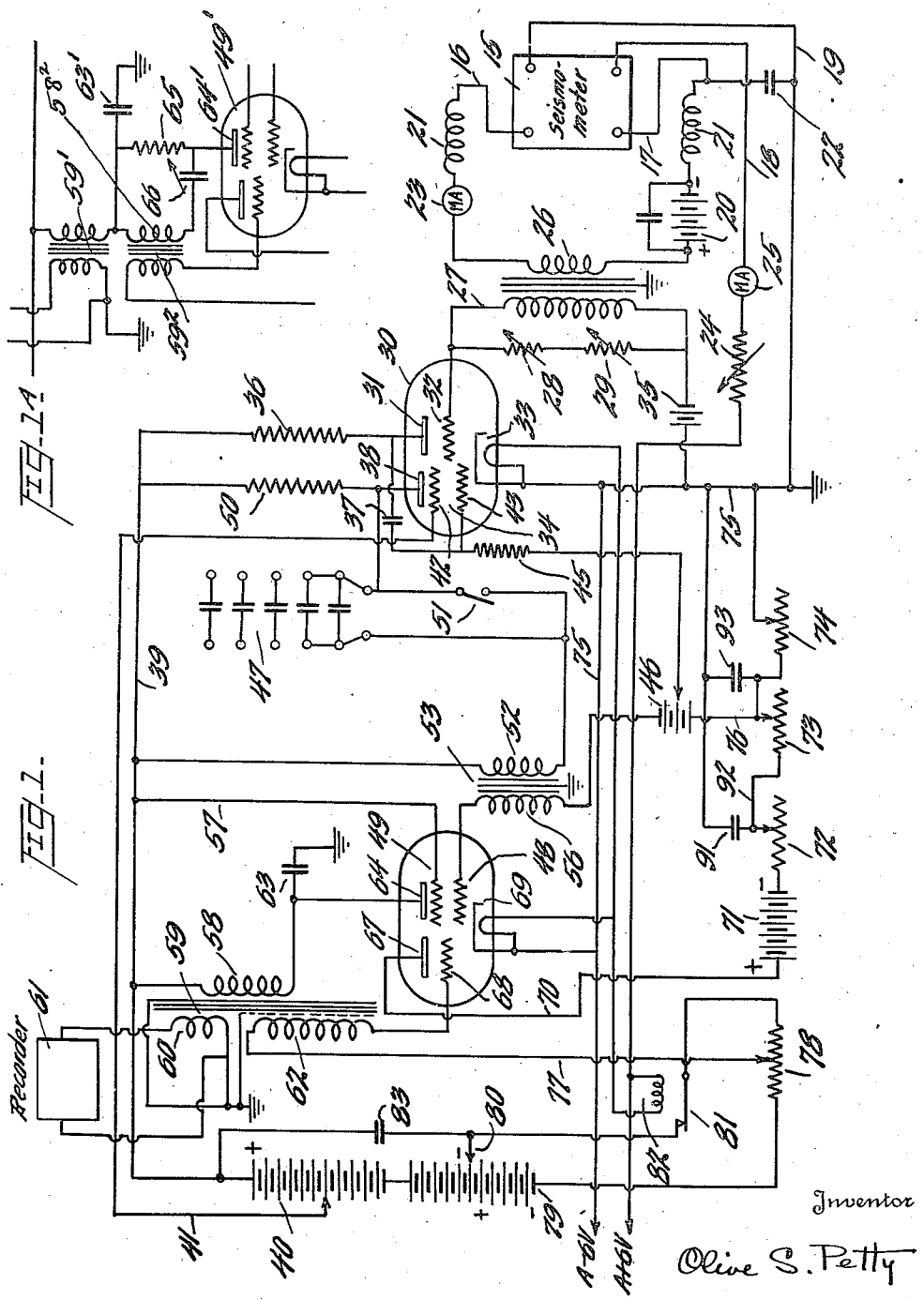

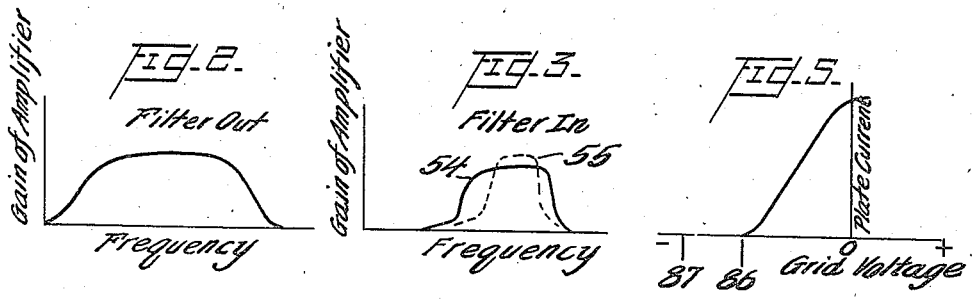
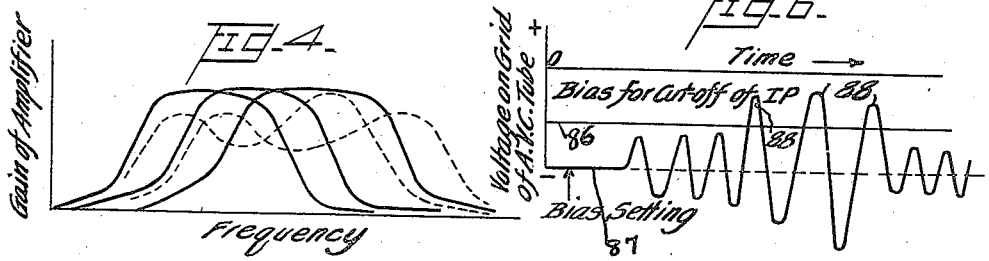
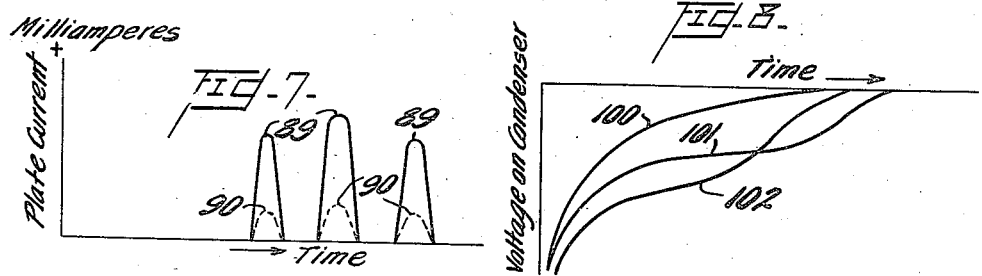
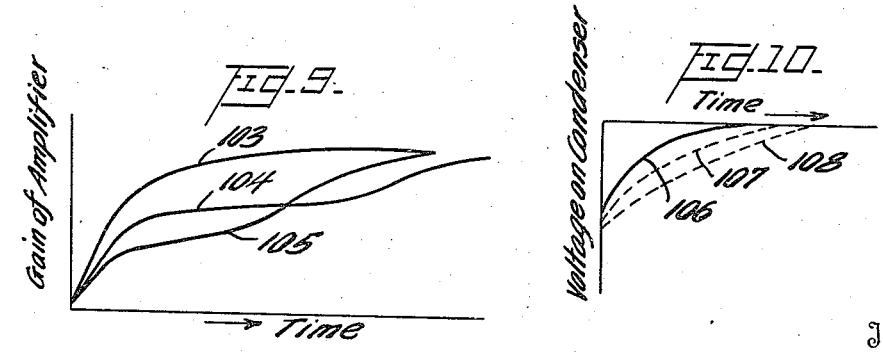

2,410,303

UNITED STATES PATENT OFFICE 2,410,303

SEISMIC SURVEYING

Olive S. Petty, San Antonio, Tex.

Continuation of application Serial No. 290,928, August 18, 1939. This application May 27, 1943, Serial No. 488,764

4 Claims. (Cl. 177—352)

This invention relates to methods of and apparatus for seismic surveying and deals particularly with the treatment of the received shock waves after their conversion to electrical equivalents, whereby a recorded chart may be made in which the maximum amplitude swings throughout the length of the chart are generally maintained below a predetermined level while weaker portions of the waves are amplified to usable levels. The invention contemplates especially certain improvements in methods and apparatus for amplifying and recording the waves and the application is a continuation of my prior application Serial No. 290,928, filed August 18, 1939.

Heretofore in making use of seismic methods and apparatus for surveying sub-surface geological formations, a great many difficulties have arisen because of the limitations of equipment available, and it has not always been possible to make an accurate study of the records or charts produced because of the intermingling of several types of waves whose relative sizes may be on the order of 600 to 1.

To understand some of these difficulties a review of the general methods of use of seismic recording apparatus may be briefly made at this point. Such surveys are made by correlating the results attained from a plurality of records each obtained by generating seismic waves, for instance by firing a charge of dynamite below the surface of the earth at a position generally referred to as the "shot point," and detecting, at remote points, the time of arrival of radiating seismic waves as well as the instant of the explosion and recording the same on a seismogram, usually by photographic methods.

The seismic waves generated in the earth by the exploding charge travel in all directions and some arrive at the receiving or detecting stations, at remote points, by short paths of travel through strata near the surface of the earth. These are known as "direct waves" and because of their relatively short path and major horizontal component of vibration, usually arrive first at the detector. A second form of waves referred to as "reflected," travel down to horizons at various distances below the surface of the earth and at various inclinations thereto and are reflected back to the receiver. Such waves from the upper horizons usually travel in longer paths than the direct waves, while those from the deeper horizons always travel in longer paths and take more time to reach the detector than do the direct waves. The reflected waves consisting largely of vertical components have an intensity usually very much less than that of the direct waves when travelling from upper horizons, while those from progressively deeper horizons are more and more attenuated, having sometimes only $1/600$ of the intensity of the direct waves.

It is customary to record on a single chart the record traces from a plurality of detectors and it is highly desirable to keep the physical size of the chart within reason. The waves are converted from seismic to electrical at the detector, but there still remains the tremendous discrepancy in peak amplitudes between the direct and the reflected waves as well as the problem of attenuation of the later arriving reflected waves. Most detectors seek to convert the seismic waves to electro-motive-forces, the voltages of which are indicative of the amplitudes of the corresponding seismic waves. The outputs from such detectors are usually at such low levels that they are not adequate throughout the whole wave train to operate the recorder which includes a galvanometer having multiple moving elements each responsive to the voltages of the waves from one detector. Resort is therefore had to electric amplification to raise the level of the waves so that the weakest produce a usable trace on the chart. If this is done with the conventional amplifier having uniform gain throughout, the traces of the direct waves become so large that they cannot be kept within the physical confines of the chart and furthermore those on adjoining traces tangle on the record. Likewise there is difficulty of entanglement of the moving systems of a multiple galvanometer thereby vitiating the record and probably damaging the instrument. Even with excellent damping applied to the moving systems of the galvanometer, the tremendous swings imparted by the oversized direct waves prevent rapid subsidence and accurate recording of the earlier portions of the reflected waves, and it is highly important to know the instant the first reflected wave is received. It is also important to know the instant of arrival of the first direct wave.

To overcome the various difficulties outlined above, the present invention contemplates the provision of an amplifier, to be inserted intermediate the detector and the galvanometer of the recorder, which has such characteristics as to substantially eliminate the difficulties and to provide on the chart a trace of the seismic waves having a general average level of maximum swings which is substantially uniform or increases toward the end of the trace.

To obtain these improved results it is an object of the present invention to provide an amplifier for use between a seismic detector and recorder which is provided with an automatic gain adjuster at all times under the control of the wave size.

Another object of the invention consists in the arrangement of an amplifier whereby it produces at all times such gain as tends to level out the general average of the maximum swing heights of the response curve of the detector.

An important feature of the invention comprises a gain control responsive to the output of the amplifier in which the gain remains constant until the output passes a predetermined level after which the gain is maintained at such value as to substantially hold this level during the tendency to excess output and thereafter slowly returns to normal over a period of several seconds whereby compensation for attenuation at the extreme end of the wave train is made.

Another important feature of the invention comprises an amplifier gain control operating by superimposing portions of the plate current of an automatic volume control tube onto the grid of the amplifier tube or tubes and in using a condenser charged from this plate current to deliver the same over a period of time to said grid, whereby no abrupt increase in gain is effected after any decreases.

Still another important feature comprises apparatus for regulating the rate of discharge of said gain control condenser, the time over which the discharge takes place, and the type of discharge-time curve resulting.

A further important feature of the invention comprises means for determining the threshold value below which the gain normally remains constant and above which any increase in output causes a corresponding decrease in gain. This threshold value may itself remain fixed or may vary throughout the taking of a record in any predetermined and desired manner. In general, I prefer that the threshold value shall not be fixed, as regards the amplitude of energy sufficient to initiate functioning of the gain control, but that it shall vary in accordance with the frequency of the received signals.

For example, I have found that it is desirable to maintain a predetermined average amplifier output for the highest usable frequencies, and a somewhat larger average output of the amplifier when the energy is of lower frequencies. This would preferably vary continuously from the highest to the lowest usable frequency. Thus where high frequencies predominate the peaks of the recorded traces are quite sharp and a large amplitude is not required for readily locating the peak. If the same amplitude is used whenever the low frequencies predominate, on the contrary, the peaks are not sharp and are difficult to readily locate. This difficulty can be overcome by using a larger amplitude for the low frequencies. If a large number of traces are placed on a single record this would mean that one trace would deviate beyond the rest position of one or more of the traces near it. This is not objectionable for low frequencies since it is much easier to follow the traces when they deviate slowly. The low frequency energy is usually from the deep reflecting beds, so there is very little step-out from one trace to the next trace; in other words, each trace nearly duplicates the trace above it where low frequencies exist. This means that this similarity of adjacent traces permits the use of appreciably larger amplitude without the overlapping of the traces. If this same large amplitude were used for the high frequencies, it would be difficult to follow them since they would be moving so rapidly. It would also be difficult to follow the high frequency energy at large amplitudes because there would not be the duplication of the traces from one to the next since the normal step-out of the reflected energy from shallow beds (which produces high frequency energy) may be a half a cycle or more; in other words, instead of the traces being merely identical, one above the other, they will be shifted by one-half cycle or more. For this reason it is extremely desirable that the traces not overlap when high frequency energy is being recorded. It will readily be noticed that the instant application shows a method whereby all of the above advantages are obtained. Whenever the low frequencies predominate, on the contrary, very high gain is helpful in emphasizing the peaks of the low frequency cycles and there is no confusion in the record since the separate cycles are more widely spaced.

It is therefore an object of the invention to provide automatic gain control which tends to suppress the amplification of higher frequencies and to favor the amplitude of lower frequencies within a usable frequency range. Ordinarily the effect of such an arrangement in practice is to establish increased amplitude or sensitivity toward the end of the record since seismic waves reflected from the deeper beds and arriving later usually tend to be lower in frequency as well as in amplitude. Consequently, in an amplifier in which higher frequencies are relatively more effective in reducing the gain, the automatic gain control is, generally speaking, more effective near the beginning of the record than toward the end of the record.

Other and further features and objects of the invention including the provision of various filters and the like for improving the operation of the whole amplifier will be more apparent to those skilled in the art upon a consideration of the accompanying drawings and following specification wherein are disclosed two exemplary embodiments of the invention together with various curves representing the operation of important portions of the circuits.

In said drawings:

Figure 1 is a wiring diagram of an amplifier constructed according to the present invention shown connected to the output of a detector;

Figure 1A is a fragmentary view of a modified form of the last stage of amplification;

Figure 2 is a curve showing the amplifier gain at various frequencies without the use of a filter;

Figure 3 is a similar curve showing the gain with a filter in circuit;

Figure 4 shows similar curves with possible filter adjustments;

Figure 5 is a characteristic curve of the automatic volume control tube showing how the grid bias can be adjusted to cut off plate current;

Figure 6 is a curve showing how the grid potential of the A. V. C. tube is modified by the amplifier output;

Figure 7 is a corresponding curve illustrating the resultant plate current flow;

Figure 8 is a set of curves showing various possibilities for changing the rate, time, and style of current discharge from the gain control condenser; while Figure 9 shows the resultant amplifier gain; and Figure 10 is a set of curves showing the effect of the filter resistance value on the time of current leak off.

Referring now to the drawings for a better understanding of an actual embodiment of the invention, there is shown in Figure 1 a detector or seisometer 15 of any suitable type adapted to convert seismic waves to wave-form electrical energy. The detector shown happens to be equipped with a single stage pre-amplifier and therefore the cable leading to the amplifier of the present invention includes four conductors 16, 17, 18, and 19, the last two of which conduct filament heating current from a suitable "A" battery as represented at the left-hand side of the figure. The conductors 16 and 17 carry the B-supply from battery 20 and return the output of the single stage amplifier to the amplifier of the invention. Each of these signal leads contains a radio frequency choke coil 21 and one of these is connected to the —A conductor by means of a condenser 22 for filtering out alternating currents which may be picked up by the conductors leading to the detector. These conductors are sometimes several hundred yards in length and may, by inductance, pick up hum from A. C. power lines and the like. A milliameter shown at 23 indicates the plate current of the tube in the detector while the variable resistance 24 permits regulation of the detector filament current as indicated by the milliameter 25. This is essential because of the different lengths of conductor cable which might be used.

It is not uncommon to employ groups of detectors or seismometers in which the outputs of the seismometers in each group are combined, the seismometers in the group being so spaced as to minimize the effect of ground roll. It will be appreciated that such groups of seismometers act, for the purpose of the instant invention, as separate units and it will be understood that whenever one seismometer or detector is referred to hereinafter, such groups having combined outputs are considered as embraced within such reference.

An incoming signal passes through the primary 26 of a suitable transformer, the secondary 27 of which is shunted by a pair of variable resistors 28 and 29, one for coarse and one for fine adjustment. These controls are for manually setting the level of the signal applied to the amplifier of the present invention. They merely waste a portion of the signal from a detector and hence control the maximum gain of the amplifier. They are set at one value for any one record and remain unchanged during the taking of the same but are often changed from one record to the next.

The secondary 27 feeds into the cathode and grid in the right-hand portion of the thermionic tube 30 which constitutes a simple triode amplifier having the plate 31, grid 32, and heated cathods 33 which it shares in common with the elements of the second stage amplifier indicated at 34. A suitable biasing battery 35 is arranged in the grid circuit of the triode amplifier. This amplifier is coupled to the second stage amplifier by means of a plate coupling resistor 36 and condenser 37. The plate 31 as well as the plate 38 of the second stage tube receive their "B" battery supply through the common conductor 39 connected to the positive end of the battery 40. A tap 41 in this battery supplies the screen grid 42 of the second stage amplifier with a somewhat lower potential, permitting more gain and better automatic volume control. The control grid 43 of the second stage amplifier is coupled by the condenser 37 to the plate of the first stage and receives its bias through resistor 45 from a tap on battery 46.

The constants of the coupling condenser 37 from the first stage to the second stage, of the grid coupling resistor 45 of the second stage, and of the plate coupling resistor 36 of the first stage are all predetermined or adjusted to give a selective frequency response as desired. The incoming signal in most cases is of a frequency varying from 20 to 100 cycles, whereas a number of unwanted noises are at higher or lower frequencies and may thus be partially or completely eliminated. To provide a further filter action, an adjustable coupling condenser generally denoted 47 provides the coupling between the second stage plate 38 and the control grid 48 of the third stage amplifier valve 49, functioning along with the plate resistor 50. As shown, condenser 47 comprises a plurality of small condensers, any number of which may be placed in circuit by appropriate connections or links. A switch 51 permits removing the condenser bank from the circuit by shunting the same. This condenser acts in the nature of a filter, first to keep the plate current of the tube from flowing through the primary winding 52 of the interstage coupling transformer 53, thus improving the transformer life and permitting its design to be more efficient. In addition, the condenser is used to vary the frequency response of the amplifier, giving it the highest gain on the desired frequencies and very low gain on undesired frequencies, which effect comes from resonating the transformer primary.

Figure 2 shows the result of operating the amplifier with the filter cut out, and it will be seen that the frequency response for the main portion thereof has a fairly uniform gain over a wide range. Figure 3 is a similar view with the filter cut in, showing in solid line 54 a flat topped, sharply cut off response over a short frequency range. The size of the plate coupling resistor 50 may be adjusted to give this response the flat top and much greater sharpness of resonance as shown in dotted line 55 in Figure 3. Figure 4 shows how the filters may be adjusted to maintain the same sharpness of resonance within various frequency ranges.

The secondary winding 56 of the interstage transformer 53 connects between the control grid 48 and the bias battery 46. The screen grid of this tube is connected by wire 57 to the conductor supplying "B" battery to the plates 31 and 38, although it might be connected to conductor 41 supplying potential to the screen grid of the second stage amplifier. The output from the third stage is fed through the primary 58 of transformer 59, one secondary 60 of which delivers the amplified waves to the moving element of a galvanometer associated with and forming part of a recorder 61. Another secondary 62 takes off a portion of the output of the amplifier for supply to the automatic volume control tube as will be further described hereinafter. The condenser 63 between the plate 64 of the third stage tube and ground serves to by-pass high frequencies and to resonate the output transformer to assist in the desired filter action. At the same time, this condenser performs the important function of assisting in the damping of the moving element of the galvanometer.

In Figure 1A is shown an optional way of connecting the third stage tube 49' to the output transformer 59'. A second transformer 59² has a primary in series with that of 59' and which is fed from the plate 64' of the last amplifier stage by means of the resistance 65 and condenser 66, thus giving a resistance coupling in which the values of the condenser and resistance are critical, again assisting in frequency selection, this time, however, to determine those frequencies on which the automatic volume control will function. Hereinafter the expression "automatic volume control" will be designated by the characters A. V. C. for convenience. The secondary of transformer 59' feeds the galvanometer. The features of Figure 1A can be substituted in Figure 1 where desired without any other changes.

The second half of tube 49 is a triode containing plate 67, grid 68, and the common heated cathode 69 which functions also with the elements of the third stage amplifier. The plate of this tube is connected by wire 70 to a separate "B" battery 71, the negative pole of which leads through variable resistors 72, 73, and 74 back to wire 75 connected to the negative "A" battery and common ground terminal. It will be noted that bias battery 46 is connected by wire 76 to the slider of the resistor 73 and hence is also connected to the ground through resistor 74 shunted by condenser 93. The battery 71 may have a potential of about 45 volts for the type tube shown, while resistors 72, 73, and 74 are of the order of 200,000 ohms each.

The grid 68 of the A. V. C. tube is fed from the secondary 62 of the output transformer 59, the opposite end of which is connected by conductor 77 to the slider of a potentiometer 78 energized from the portion of "B" battery 40 between negative terminal 79 and adjustable tap 80, through the contacts 81 of a relay, the winding 82 of which is in series with the several tube heaters. This ensures the contacts 81 remaining open until the amplifier is turned on, thereby not draining the lower portion of the "B" battery through the potentiometer. The main portion of the "B" battery is shunted by filter condenser 83.

The slider on the potentiometer 78 is set to supply a sufficiently negative bias to the control grid 68 of the A. V. C. tube to normally prevent the flow of any plate current in that tube. A reference to Figure 5 will make this clear, where the characteristic curve of the tube is shown as between grid voltage and plate current. The cut-off point is at 86 when the grid is to that extent negative. The grid, however, is carried negative to the extent indicated, for instance, at 87 and will have to become positive by an amount indicated by the distance between 86 and 87 before any current will flow in the plate circuit. The position of 87 is adjustable by moving the slider on the potentiometer 78.

Referring now to Figure 6 the operation of the grid bias in preventing and permitting current flow in the plate circuit is illustrated. The sinuous wave represents the output from the last amplifier stage as applied to the grid 68 in series with its negative bias. It functions, of course, on both sides or in other words is additive to or subtractive from the bias setting, again indicated in this figure by 87. The amount of bias required for cut-off is shown at 86. Whenever the positive potential supplied from the transformer winding 62 exceeds the difference between 86 and 87 as shown in the three swings 88, the grid is forced to a sufficiently reduced bias to permit plate current flow as indicated in Figure 7, where milliamperes of plate current are indicated by the ordinates. The curves 89 in solid lines indicate the corresponding plate current flow for the three swings 88 of Figure 6 which cross the position of cut-off bias.

The curves of Figures 6 and 7 indicate, in general, the manner of controlling the gain of the amplifier in accordance with its output for, as will later be described in more detail, the plate current from the automatic volume control tube determines the total amount of bias on the control grids of the second and third stage amplifiers, functioning in conjunction with battery 46.

With the automatic volume control tube inoperative, i. e. when insufficient output from the last stage of the amplifier is available to reduce the tube bias to permit plate current flow, the gain of the amplifier is fixed and constant irrespective of the size of the output as long as it remains beneath the value predetermined by the setting of the potentiometer 78. This setting determines the threshold value above which any output from the amplifier tends automatically to reduce the gain thereof. The amplifier may be said to have a variable gain, the value of which is fixed until the output crosses the threshold after which the gain is reduced in accordance with the tendency to increase the output. This has a levelizing effect on the maximum amplitude of voltage swings delivered from the amplifier without, however, changing the relative size of the swings beneath the threshold value except as hereinafter described.

The amount of plate current flowing to the automatic volume control tube is determined not alone by the setting of the bias resistor 78 but by the setting of the resistor 72 which is directly in the plate circuit. This resistor may be set, for instance, to obtain plate current swings of the size indicated at 89 in Figure 7 or to obtain smaller swings as are indicated by dotted lines 90. The settings of the resistors 73 and 74, in series with 72 and ground, are not so effective in regulating the plate current since they are shunted by fixed condenser 91 of considerable capacity, for example of the order of 1 mf., which by-passes the A. C. peak impulses to ground and at the same time is charged with a substantially pure direct current voltage. The upper plate of condenser 91 is grounded and the potential of the lower plate is negative, feeding through conductor 92 and the portion of the resistor 73 set by means of the slider to the conductor 76 and into the positive side of battery 46, increasing the negative potential supplied to the grids of the second and third amplifier tubes, thereby reducing the gain of these amplifiers in accordance with the size of the current swings on the A. V. C. plate.

Since the charging current for the condenser 91 consists of pulsating D. C. it is not sufficiently free from ripples to be fed directly back into the grids of the amplifier stages. It is the function of the resistor 73 and the condenser 93 to form a filter smoothing out these ripples and causing substantially pure direct current to be applied to the grids. The setting of the resistor 73 and the size of the condenser 93 affect the manner in which the charge on the condenser 91 leaks off to the grids. As hereinbefore mentioned, condenser 91 may well have a capacity of the order of 1 mf. If these filter elements were not present, the charge would leak off from condenser 91 to the grids as shown by the curve 100 in Figure 8. Appropriate settings of the condenser and resistor permit the current to leak off in the manner indicated by such curves as 101 and 102, increasing the time of discharge and changing the slope thereof in accordance with certain characteristics desired to be accentuated on the record chart. The resultant effect on the gain of the amplifier is indicated in Figure 9 where the curve 103 indicates the operation without the filter elements 73, 93, while curves 104 and 105 correspond to the condenser and resistor settings indicated by curves 101 and 102 respectively.

The variable resistor 74 affects the rate of leakage from the condenser 93 and indirectly from condenser 91 and various settings thereof result in curves such as shown at 106, 107, and 108 in Figure 10. This resistor 74 is also effective to select the total voltage available for return to the main amplifier tube control grids. If resistance of resistor 74 is equal to resistance of resistor 73, approximately 50% of total voltage developed across 91 is fed back into lead 76 to reduce the gain of the amplifier. However, if resistance of 74 is four times resistance of 73, approximately 4/5 of total voltage of condenser 91 will be fed back into lead 76 to vary the gain of amplifier, hence there will be a large variation in gain for a slight excess in signal level.

Operation of the automatic gain control is particularly effective for seismic recording because the customary output from the detector comprises, first, waves of large amplitude directly received; second, waves of much less amplitude reflected from sub-strata. These second waves die out over a period of several seconds and it is highly desirable that their amplitudes be maintained at usable size to the end of the chart. The setting of the resistor determining the bias on the A. V. C. tube should be such that each of the swings of the direct wave voltages causes the A. V. C. tube to function and therefore the condenser 91 is maintained charged until the last of the direct waves ceases. The first of the reflected waves is normally too small to cause functioning of the A. V. C. tube but the gain of the amplifier does not immediately return to normal since the charge on condenser 91 leaks off slowly and hence holds the amplifier grids at excess bias. The time required for this charge to leak off can be set by appropriate adjustment to extend substantially for the time during which it is desired to record the reflected waves, the gain slowly increasing as the strength of the waves is reduced because of the lowering voltage on 91, producing a chart of uniform character. The total time over which the automatic volume control functions is controlled by resistor 74 as previously mentioned. The size of the middle portion of the A. V. C. discharge curve is largely controlled by resistor 73. The size thereof immediately after the automatic volume control has functioned is controlled by resistor 72 while resistor 78 controls the size which the output signal must reach for the A. V. C. to function at all. Thus the operator can, by appropriate settings of the various variables obtain the type of chart trace most suitable for the terrain being explored and for the use desired to be made thereof. By making trial charts he can compensate for various unexpected factors and achieve superior results, obtaining a chart useful throughout its full range.

As has been pointed out hereinbefore, it is highly desirable that the gain control be selectively responsive to the arrival of waves of different frequencies so as to suppress to a greater extent waves of high amplitude and high frequency than waves of comparable amplitude of low frequency. To this end I may employ the arrangement illustrated more particularly in Figure 1A of the drawings in which, as hereinbefore pointed out, a requency responsive filter, comprising, for example, resistance 65 and condenser 66, is associated with the source of supply to the automatic volume control tube. By proper selection of the values of these filter elements, signals of high frequency may be favored and greater reduction of the gain may thereby be obtained whenever the higher frequencies are being received. For example, satisfactory results may be achieved if the impedance of the condenser 66 at 50 cycles is substantially equal to the impedance of winding $58^2$ of transformer $59^2$ which is comparable to the value of resistance 65. If the highest usable frequency is higher than 50 cycles it may be desirable for this relationship to exist at this higher frequency.

Under these conditions the threshold value for the automatic gain control is in effect substantially higher for signals in which low frequencies predominate than for signals of comparable amplitude in which high frequencies predominate. Thus whenever high frequencies predominate, and the signal peaks on separate cycles of the recorded trace are therefore quite close, the sensitivity of the amplifier is reduced on the occurrence of relatively small increase in signal amplitude, so as to minimize confusion on the record. When, however, the signal frequencies are predominantly low, and the peaks are fairly widely separated, amplification is not closely controlled by the automatic gain circuit, the gain is higher for signals of comparable amplitude, and the clarity of the record is improved without any apparent crowding of the successive peaks.

It will be appreciated that the filtering action just described may be obtained in some other point in the circuit. For example, a suitable filter might be associated with the secondary winding 62 of the output transformer with similar results.

Having thus described the invention, what is claimed as new and desired to be secured by Letters Patent is:

1. In apparatus for use in seismic surveying, the combination with a seismometer for converting incoming seismic energy into electrical waveform signals, and means for amplifying and recording such signals, said amplifying means including at least one thermionic valve amplifier, of a thermionic gain control valve for applying to a control grid of said valve amplifier a more negative bias in response to increase in amplitude of incoming energy above a predetermined amplitude, means initially biasing the grid of said gain control valve beyond cut-off, and means applying to the grid of said gain control valve a voltage derived from the incoming energy such as to render the grid potential less negative than said initial bias, said last named means including a frequency selective device favoring the higher frequencies within a usable band of frequencies.

2. In apparatus for use in seismic surveying, the combination with a seismometer for converting incoming seismic energy into electrical waveform signals, and means for amplifying and recording such signals, said amplifying means including at least one thermionic valve amplifier, of a thermionic gain control valve rectifier for applying to a control grid of said valve amplifier a more negative bias in response to increase in amplitude of incoming energy above a predetermined amplitude, means initially biasing an element of said gain control valve rectifier beyond cut-off, and means applying to an element of said gain control valve a voltage derived from the incoming energy such as to render the element potential less negative than said initial bias, said last named means including a filter for emphasizing energy of higher frequency within the range of useful frequencies, whereby the voltage of the gain control valve is varied to a greater degree by incoming energy of predominantly high frequencies than by incoming energy of predominantly low frequencies of comparable amplitude.

3. In apparatus for use in seismic surveying, the combination with a seismometer for converting incoming seismic energy into electrical waveform signals, and means for amplifying and recording such signals, said amplifying means including at least one thermionic valve amplifier, of a thermionic gain control valve for applying to a control grid of said valve amplifier a more negative bias in response to increase in amplitude of incoming energy above a predetermined amplitude, means initially biasing the grid of said gain control valve beyond cut-off, and means responsive in greater degree to high than to low frequencies within the usable frequency range for applying to the grid of said gain control valve a voltage derived from the incoming energy such as to render the grid potential less negative than said initial bias.

4. In apparatus for use in seismic surveying, the combination with a seismometer for converting incoming seismic energy into electrical waveform signals, and means for amplifying and recording such signals, of means operable in response to increase in signal energy above a predetermined ampliutde for decreasing the gain of said amplifying means, said last named means including a device for initiating operation of said means to decrease the gain, said device affording filtering action favoring the higher frequencies within the usable range, whereby the gain at all frequencies is decreased in greater degree by signals of large amplitude and predominantly high frequency than by signals of comparable amplitude and predominantly low frequency.

OLIVE S. PETTY.